UNITED STATES PATENT OFFICE.

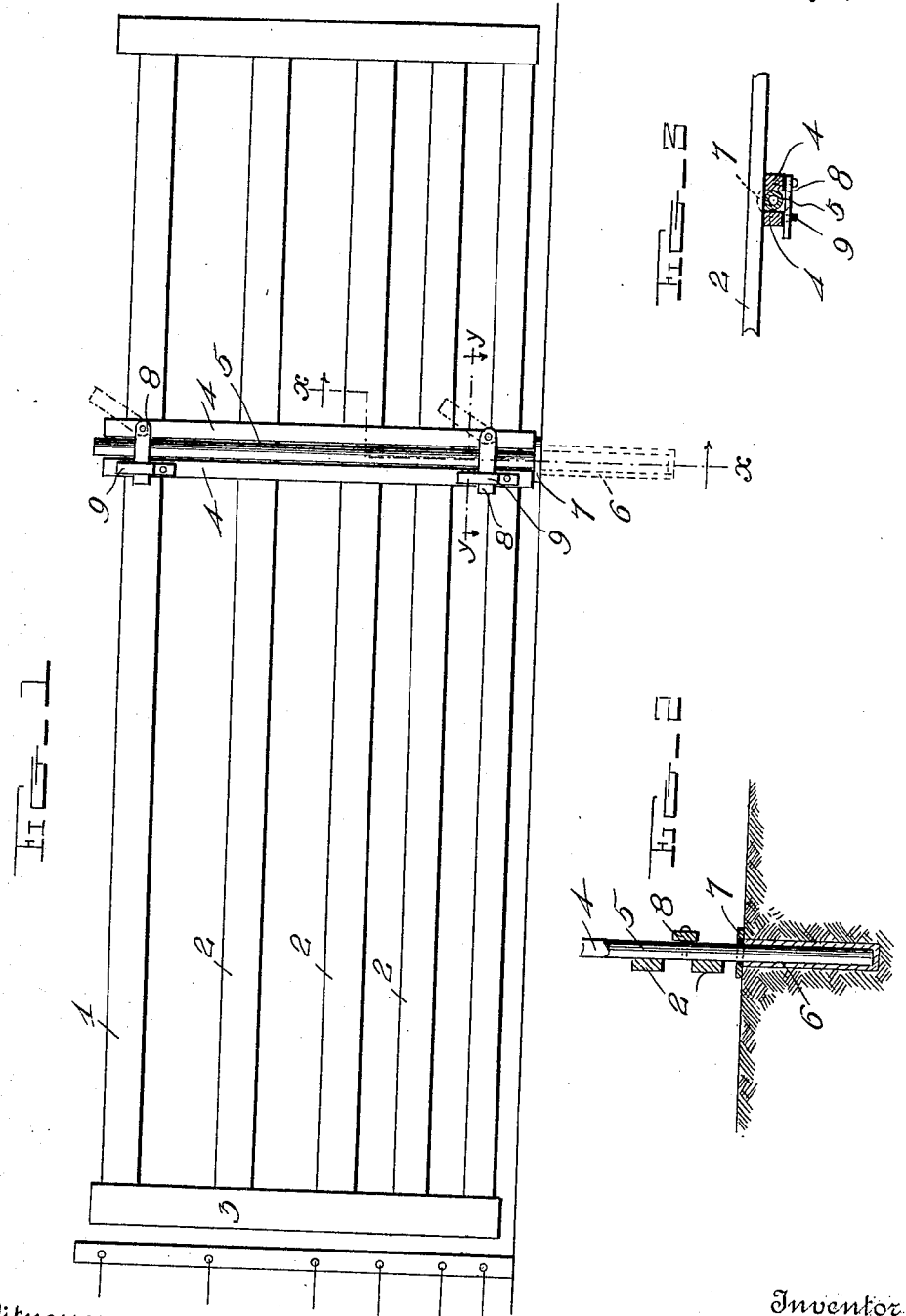

JAMES FINCH, OF ALBION, MICHIGAN.

GATE.

No. 920,305.  Specification of Letters Patent.  Patented May 4, 1909.

Application filed June 8, 1908. Serial No. 437,442.

*To all whom it may concern:*

Be it known that I, JAMES FINCH, a citizen of the United States, residing at Albion, in the county of Calhoun and State of Michigan, have invented certain new and useful Improvements in Gates; and I do declare the following to be a full, clear, and exact description of the invention, such as will enable others skilled in the art to which it appertains to make and use the same.

My invention relates to gates, and more especially to the farm type.

It has for its object to provide for the ready opening and closing of the gate and for the bodily removal of the gate and its pivoting or hinging support under certain conditions, and means whereby the gate may be readily replaced.

With these and other objects in view, the invention consists of certain novel features of construction, combination and arrangement of parts as will be described and particularly pointed out in the appended claims.

In the accompanying drawing illustrating the preferred embodiment of my invention, Figure 1 is a side elevation of the gate with the clips shown in alternate position in dotted lines by way of illustrating the removal of the gate; Fig. 2 is a detail vertical sectional view produced on the line $x$—$x$ of Fig. 1; and Fig. 3 is a cross sectional view on the line $y$—$y$ of Fig. 1.

In practicing my invention I provide a gate, 1, of the general outline disclosed, preferably composed of a plurality of longitudinal members or boards, 2, secured to uprights or end pieces, 3. Intermediate the said end pieces or uprights are suitably secured to the longitudinal members 2 of the gate parallel spaced apart upright members or pieces, 4, the purpose of which will presently appear.

A preferably tubular or cylindrical member or upright 5 is seated or let into a socket or tubular piece, 6, suitably anchored in the ground, with its upper end about flush therewith. Said upright member or pivot, 5, is received between the spaced apart parallel members, 4, of the gate, said gate being held in a slightly elevated or raised position from the surface of the ground, which is effected by arranging a suitable washer, 7, upon the upper end of the socket, 6, and upon which washer rest the lower ends of the members, 4, of the gate.

Suitably pivoted to one of the parallel members, 4, of the gate are clips or members, 8, said clips having their free ends received between stirrups or keepers, 9, suitably secured to the opposite one of the parallel members for the retention of the gate in position upon the pivot or support, 5. It will be noted that by this arrangement the gate may, by suitably applying pressure thereto, be swung horizontally upon said pivots and thus be opened or closed as occasion may require. It is also to be observed that in the event it may be required to permit or allow the passage of a vehicle or piece of machinery which could not be accommodated with the gate in its working position, said gate may be bodily removed by swinging the slips, 8, out of the stirrups, 9, and thus allow, as is apparent, its removal from its pivot or member 5, and the latter itself removed from its socket, affording the entire clearance of the gate-opening for said purpose. Also, it will be noted from the above construction and arrangement of parts, a very simple, inexpensive and readily constructed gate is provided which is readily bodily removed, as above noted, and replaced in its working position.

From the foregoing description, taken in connection with the accompanying drawing, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim as new and desire to secure by Letters-Patent, is:

1. A gate having spaced apart upright members or cleats secured laterally thereon, and a hinging member adapted to lie therebetween, one of said cleats having clips pivoted thereto, the other of said cleats being provided with means for the retention of said clips in effective position.

2. A gate having lateral spaced apart upright members, a hinging or pivoting member received between said lateral upright members, a socket adapted to receive the lower end of said pivoting or hinging member, a washer arranged between said socket and the lower ends of said spaced apart upright members, and clips pivoted to one of said upright members, the other of said upright members being provided with keepers for the reception of the free ends of said cleats.

3. In a gate, the combination with a ground socket, of a pivoting member secured thereto, a pair of bearing elements connected to the gate and lying on either side of said pivoting member, and latching elements connected to the bearing elements for removably holding the gate upon the pivoting member.

4. In a gate, the combination with a ground socket, of a pivoting member removably secured therein and extending vertically from the ground, a pair of bearing elements secured in parallel to the gate and adapted to lie upon either side of said pivoting member, means pivoted to one of said bearing elements for removably holding the gate upon the pivoting member, and keeper members secured to the other bearing element for retaining said means in operative position.

5. In a gate, the combination with a ground socket, of a pivoting member removably secured in said socket, and pivoted latching elements for removably securing the gate upon the pivoting member.

In testimony whereof I have hereunto set my hand in presence of two subscribing witnesses.

JAMES FINCH.

Witnesses:
JOSEPH L. THOMAS,
CHARLES A. DAVIS.